(12) United States Patent
Sato

(10) Patent No.: US 7,777,978 B2
(45) Date of Patent: Aug. 17, 2010

(54) LENS BARREL

(75) Inventor: Takehiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 11/947,354

(22) Filed: Nov. 29, 2007

(65) Prior Publication Data
US 2008/0144198 A1 Jun. 19, 2008

(30) Foreign Application Priority Data
Dec. 18, 2006 (JP) ............... 2006-339482

(51) Int. Cl.
G02B 7/02 (2006.01)
(52) U.S. Cl. ...................................... 359/824
(58) Field of Classification Search .......... 359/819–824
See application file for complete search history.

(56) References Cited
U.S. PATENT DOCUMENTS 6,819,500 B2 * 11/2004 Tsuzuki ............... 359/696
7,113,351 B2 * 9/2006 Hovanky ............... 359/824
2005/0063098 A1 * 3/2005 Matsumura et al. ...... 360/254.6
2006/0061219 A1 * 3/2006 Hazelton .............. 310/12
2007/0127325 A1 * 6/2007 Yamashita ........... 369/44.14

FOREIGN PATENT DOCUMENTS

JP 05-090418 4/1993
JP 06121514 * 4/1994

* cited by examiner

Primary Examiner—Ricky L Mack
Assistant Examiner—Vipin M Patel
(74) Attorney, Agent, or Firm—Cowan, Liebowitz & Latman, P.C.

(57) ABSTRACT

A lens barrel with improved precision is obtained by reducing fitting play of a lens barrel. A coil and a magnetic member are fixed on a lens holding member, and a magnet and a yoke are fixed on an outer barrel. When energizing the coil, the lens holding member moves in the optical axis direction along guide bars by magnetic fluxes from the magnet. The magnetic member receives a magnetic attraction force toward the magnet by leakage fluxes. In the lens holding member, a bearing sleeve is biased by the attraction force perpendicularly to the axis of the guide bar, and the resultant force of the attraction force and a gravitational force exerted on the lens holding member removes play. A resultant force of a force toward the guide bar exerted on the bearing and the gravitational force thereon removes fitting play between the bearing and the guide bar.

1 Claim, 5 Drawing Sheets

LENS BARREL

BACKGROUND OF THE INVENTION

1. Field of the Invention

The present invention relates to a lens barrel that drives a lens moving portion using a voice coil motor for use in an optical apparatus such as a digital camera or digital video camera.

2. Description of the Related Art

In recent years, the image quality of digital cameras and video cameras has been improved, their prices have been lowered and their sizes have been made smaller. Lens barrels built in cameras are also required to be manufactured with higher precision to improve optical performance and achieve high image quality at lower cost and to be made small.

In lens barrels of optical apparatuses such as digital cameras, a voice coil motor is used as an actuator that drives a lens holding member during zooming or focusing.

FIG. 6 shows the basic structure of a voice coil motor, which includes a magnet 1, yoke 2 and a coil 3. The yoke 2 has a looped shape inside which a magnet 1 is provided. A part of the yoke 2 is passing inside the coil 3 having an annular shape. Magnetic fluxes of the magnet 1 are perpendicular to the axial direction of the coil 3, and the yoke 2 forms a closed magnetic circuit through which magnetic fluxes flow. When a current flows in the coil 3, a Lorentz force associated with the magnetic fluxes of the magnet 1 is generated, and the coil 3 is subjected to a force in the axial direction.

FIG. 7 is a perspective view of a lens holding member that is driven by this voice coil motor. The coil 3 is provided on a lens holding member 5 that holds a lens 4, and the magnetic circuit element including the magnet 1 and the yoke 2 is provided on a fixed member such as an outer barrel that is not shown in the drawings. When the coil 3 is energized, a Lorentz force associated with the magnetic fluxes of the magnet 1 acts in the optical axis direction, so that the lens holding member 5 is subjected to a force in the optical axis direction.

In the lens holding member 5, a sleeve 5a is supported on a guide bar 6a having an axis parallel to the optical axis, and a bearing 5b is supported on a guide bar 6b. The direction of movement of the lens holding member 5 is restricted to the forward and backward directions along the optical axis. Thus, when the lens holding member 5 is subjected to a force in the optical axis direction, the lens holding member 5 moves relative to the outer barrel on which the magnetic circuit element is mounted, so that the lens 4 held by the lens holding member 5 is moved.

Since the direction of the Lorentz force can be switched between the forward and backward directions of the optical axis by changing the direction of the current supplied to the coil 3, the lens holding member 5 can be moved in the forward and backward directions along the optical axis. With the above structure, the lens barrel controls driving of the lens holding member 5 in zooming and focusing operations of the optical system.

In the above described bearing-sleeve-and-bar structure constituted by the lens holding member 5 and the guide bar 6a, if fitting play that deteriorates operation performance occurs, the precision of operation of the lens holding member 5 deteriorates. However, to ensure operation of the lens holding member 5 while taking into account temperature conditions as well, the fitting play should not be eliminated completely. The play will cause displacement of the lens 4 held by the lens holding member 5 in a plane perpendicular to the optical axis and tilt of the lens relative to the optical axis. To avoid such deterioration of performance as much as possible, it is necessary to reduce the fitting play as much as possible or to separately provide a conventional mechanism for removing the play.

Japanese Utility Model Application Laid-Open No. H05-90418 discloses such a mechanism for removing the play. FIG. 8 is a perspective view of this mechanism, in which a lens holding member 12 that holds a lens 11 is supported by a basic guide bar 13 and a rotation regulation guide bar 14. The lens holding member 12 is adapted to be capable of sliding in the optical axis direction. The basic guide bar 13 made of a magnetic material is passing through guide holes 12b (one of which is not shown in FIG. 8) formed on a bearing portion 12a provided in the lens holding portion 12. Magnet members 15a, 15b are embedded above the guide holes 12b. The lens holding member 12 is always biased in a direction transverse to the basic guide bar 13 by attraction force of the magnet members 15a, 15b. Thus, the play between the lens holding member 12 and the basic guide bar 13 is removed.

However, providing an additional mechanism like the conventional art shown in FIG. 8 to remove the play leads to an increase in the number of parts and complexity of the structure and assembly, which makes the cost higher and prevents downsizing of the lens barrel due to an increase in the space required to accommodate the parts.

An object of the present invention is to eliminate the above described problems and to provide a lens barrel in which the fitting play that hampers precision of the lens barrel is removed by using a small number of parts.

SUMMARY OF THE INVENTION

According to one aspect of the present invention, there is provided a lens barrel comprising a lens holding member that holds a lens and a voice coil motor that drives the lens holding member along a guide member, wherein a magnetic member is fixedly attached on the lens holding member, and the lens holding member is shifted in one direction relative to the guide member by means of a magnetic attraction force acting between the magnetic member and a magnet of the voice coil motor.

According to a further aspect of the invention, in the lens barrel, a coil of the voice coil motor is fixedly attached on the lens holding member and a magnetic circuit element formed by a yoke of the voice coil motor and the magnet is fixedly attached on a fixed portion that holds the lens holding member.

According to a further aspect of the invention, in the lens barrel, the magnetic attraction force is generated utilizing a leakage flux from the yoke.

According to a further aspect of the invention, in the lens barrel, the lens holding member is shifted in one direction relative to all guide members by a resultant force of the magnetic attraction force and a gravitational force generated by the self weight of the lens holding member.

According to a further aspect of the invention, in the lens barrel, the guide member is a guide bar, and the lens holding member is supported by a sleeve provided on the lens holding member and the guide bar in such a way that the lens holding member can slide in the axial direction of the guide bar.

According to a further aspect of the invention, in the lens barrel, the entire length of the magnetic member with respect to the optical axis direction is in the range of the entire length of the magnet with respect to the optical axis direction all over the operation range of the lens holding member with respect to the optical axis direction.

According to the lens barrel of the present invention, the play between the lens holding member and the guide bar can be removed, and precise positioning and driving of the lens can be achieved.

Further features of the present invention will become apparent from the following description of exemplary embodiments with reference to the attached drawings.

DESCRIPTION OF THE EMBODIMENTS

The present invention will be described in detail based on an embodiment shown in FIGS. 1 to 5C.

Figure 1:
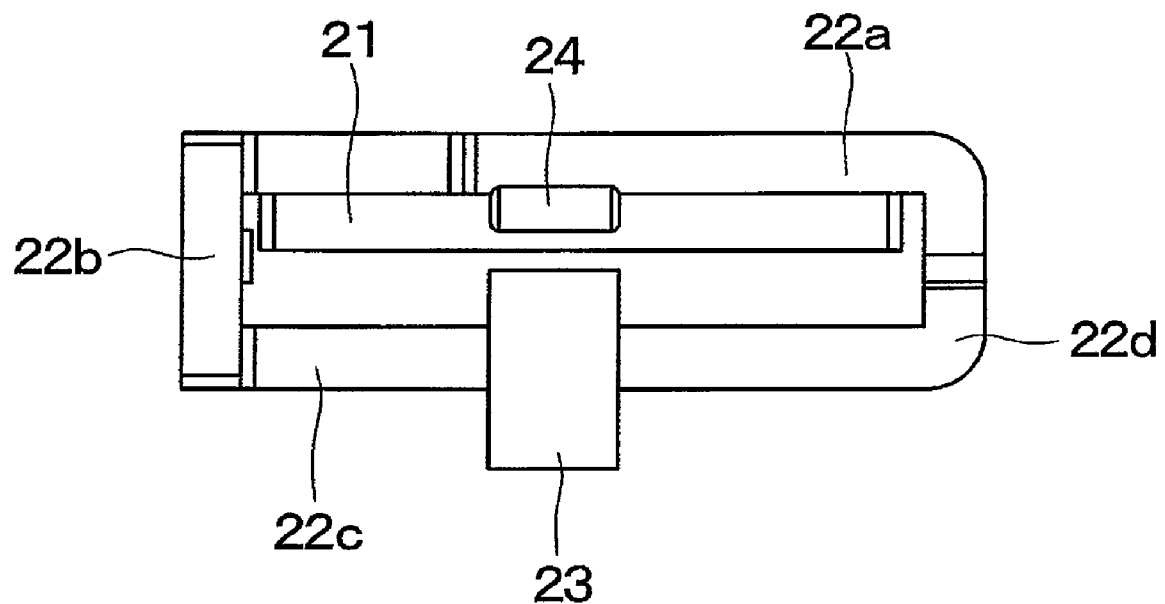
FIG. 1 is a side view of a voice coil motor.
Figure 2:
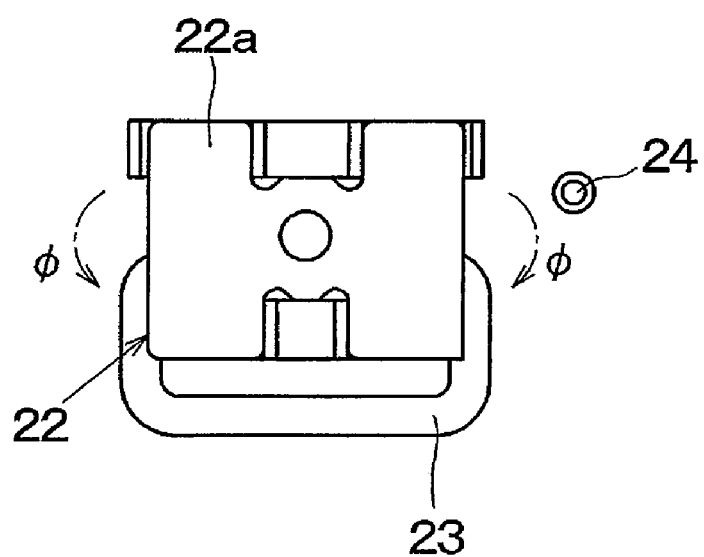
FIG. 2 is a front view of the voice coil motor.

FIG. 1 is a side view of a voice coil motor as seen from a direction perpendicular to the optical axis of a lens barrel according to the embodiment, and FIG. 2 is a front view thereof as seen from the direction of the optical axis. A magnet 21 is connected to a yoke 22, which is composed of an upper yoke 22a, a front yoke 22b, a lower yoke 22c and a rear yoke 22d that are connected in a loop shape. The lower yoke 22c is inserted through a coil 23. A magnetic member 24 is disposed in the vicinity of the magnet 21 of the voice coil motor. Magnet fluxes from the magnet 21 run in a closed magnetic circuit along the loop of the yoke 22, and a part of the fluxes leaks from the closed magnetic circuit to planes perpendicular to the optical axis, whereby a magnetic path of a leakage flux φ is formed.

In this embodiment, use is made of a magnetic attraction force that the above mentioned leakage flux φ exerts on the magnetic member 24. The magnitude of this magnetic attraction force can be adjusted by controlling the magnetic permeability of the magnetic member 24, its shape and its distance from the magnet 21.

Figure 3:
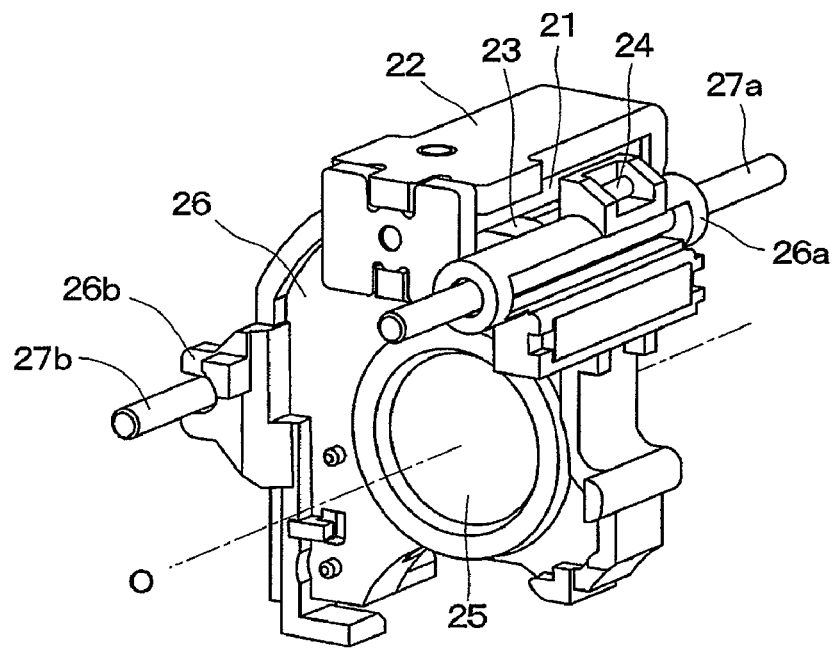
FIG. 3 is a perspective view of a lens holding member.
Figure 4:
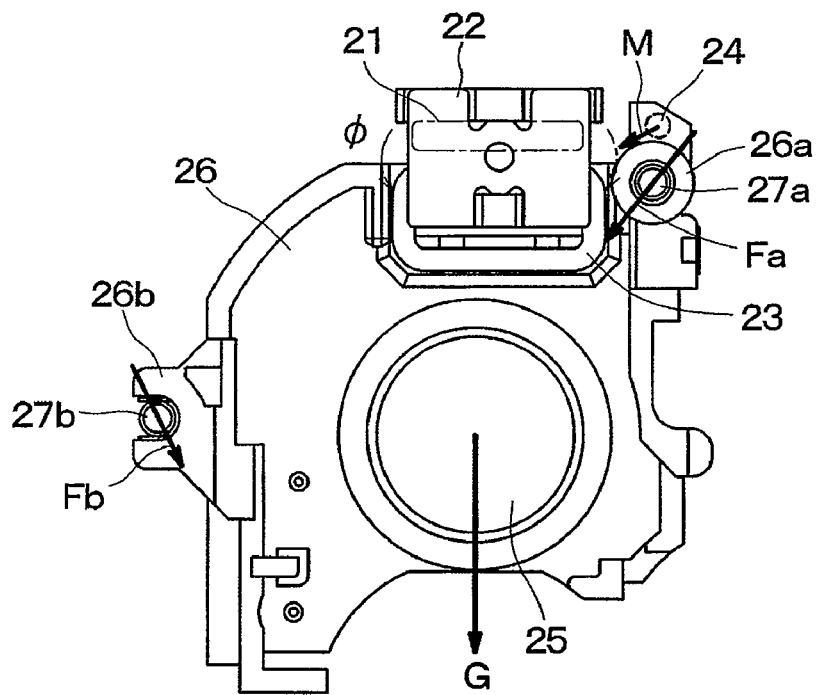
FIG. 4 is a front view of the lens holding member.

FIG. 3 is a perspective view of a lens holding member, and FIG. 4 is a front view thereof. The coil 23 and the magnetic member 24 of the voice coil motor are fixedly attached on the lens holding member 26 that holds a lens 25, and the magnetic circuit element including the magnet 21 and the yoke 22 is fixedly attached on an outer barrel of a lens barrel. A cylindrical bearing sleeve 26a serving as a sliding shaft portion provided on the lens holding member 26 is supported by a guide bar 27a in a slidable manner in a bearing-sleeve-and-bar mechanism. A bearing 26b for preventing rotation is supported by a guide bar 27b with its opening facing outside.

When the coil 23 is energized, a Lorentz force associated with magnetic fluxes of the magnet 21 is generated, whereby the lens holding member 26 is moved forward or backward in the direction of optical axis O along the guide bars 27a and 27b that are inserted through the bearing sleeve 26a and the bearing 26b respectively. Due to the presence of leakage magnetic fluxes φ in planes perpendicular to the optical axis O, the magnetic member 24 is subjected to a magnetic attraction force M in such a direction that the bearing sleeve 26 is biased in a direction perpendicular to the axis of the guide bar 27a and made closer to the magnet 21, as shown by an arrow in FIG. 4. Accordingly, the bearing sleeve 26a is shifted in one direction relative to the guide bar 27a.

In the lens holding member 26 in which the magnetic member 24 is provided, the resultant force Fa of the aforementioned magnetic attraction force M and the gravitational force G by the self weight of the lens holding member 26 acts to remove the play. In addition, between the bearing 26b and the guide bar 27b also, a force in a direction in which bearing 26b is made closer to the guide bar 27b acts on the bearing 26b. The resultant force Fb of this force and the gravitational force G by the self weight acts to remove the play between the bearing 26b and the guide bar 27b.

Figure 5A:
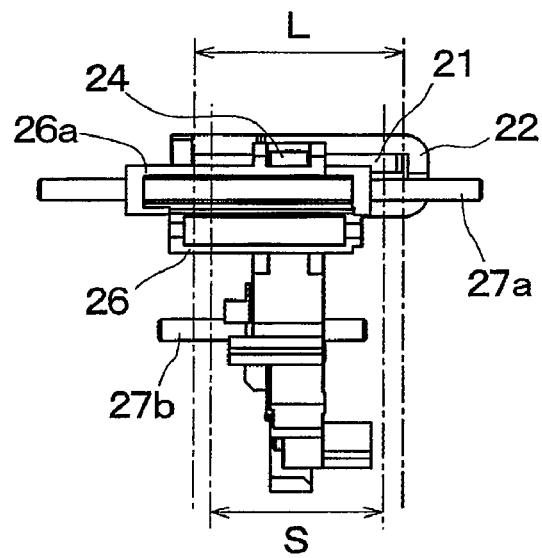
FIGS. 5A, 5B and 5C illustrate moved states of the lens holding member.
Figure 5B:
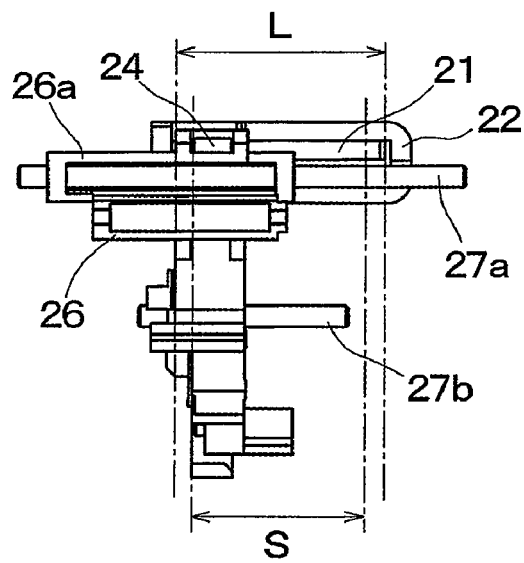

As shown in FIG. 5A, the movable range S of the magnetic member 24 along the optical axis is always within the range of the entire length L of the magnet 21 along the optical axis throughout the operation range of the lens holding member 26 in the optical axis direction. In other words, even in the state in which the lens holding member 26 is at its frontmost position with respect to the optical axis direction as shown in FIG. 5B, the front end of the magnetic member 24 with respect to the optical axis direction is rearward of the front end of the magnet 21 with respect to the optical axis direction.

Figure 5C:
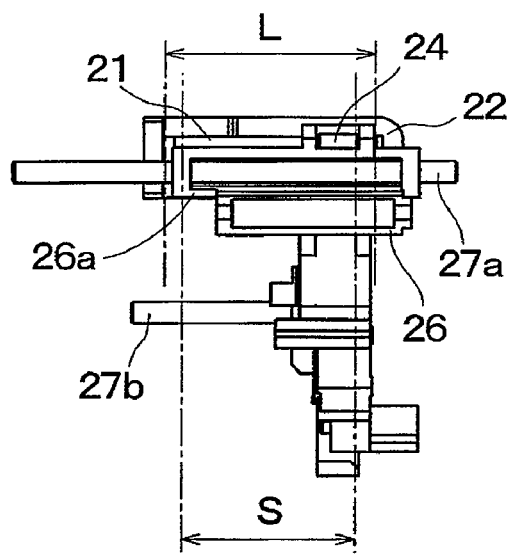
Figure 6:
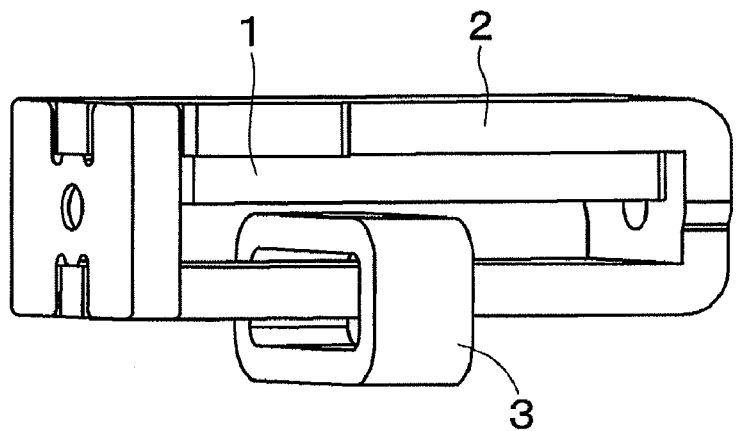
FIG. 6 is a perspective view of a voice coil motor according to a prior art.
Figure 7:
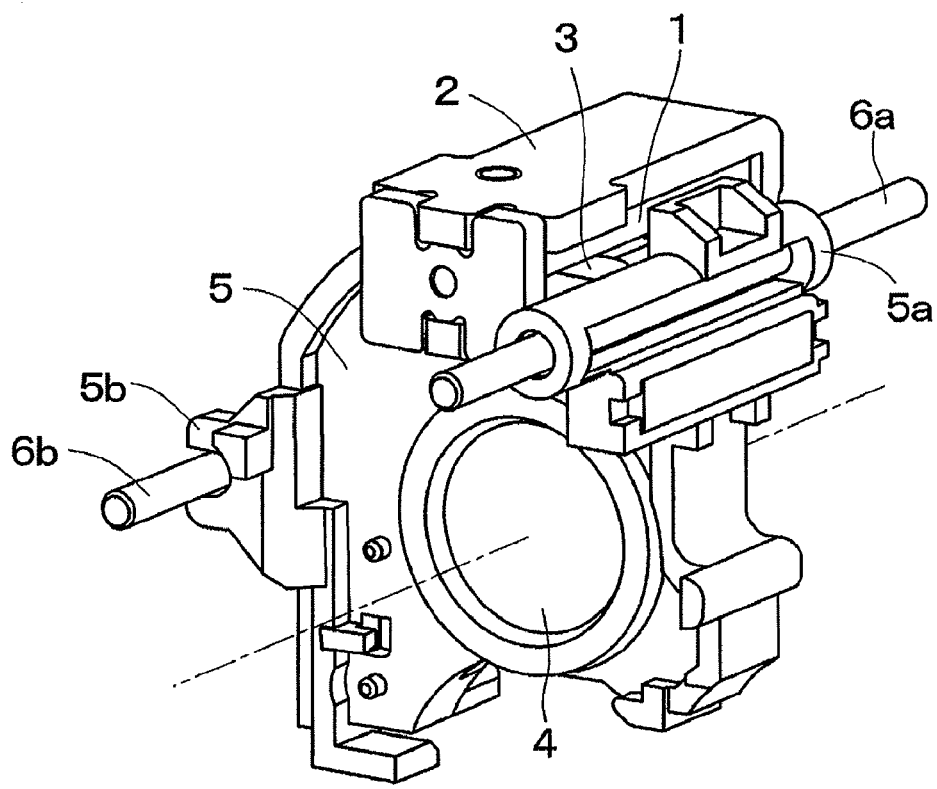
FIG. 7 is a perspective view of a lens holding member.
Figure 8:
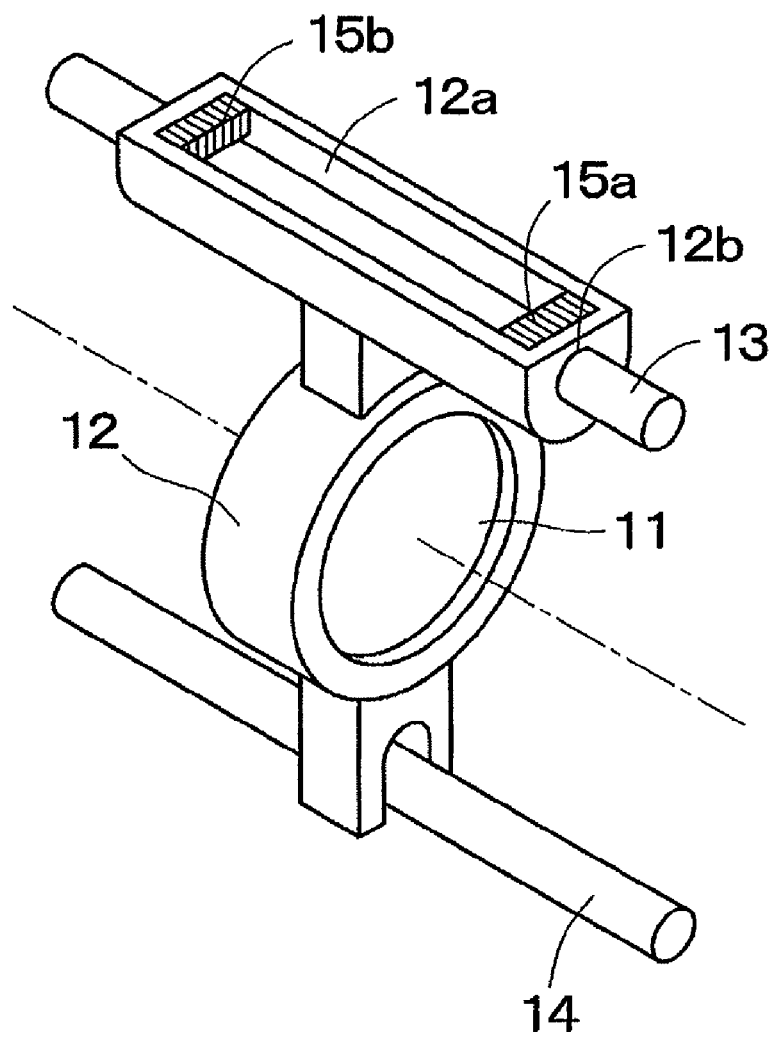
FIG. 8 is a perspective view of a mechanism for removing play according to a prior art.

In addition, even in the state in which the lens holding member 26 is at its rearmost position with respect to the optical axis direction as shown in FIG. 5C, the rear end of the magnetic member 24 with respect to the optical axis direction is forward of the rear end of the magnet 21 with respect to the optical axis direction.

Accordingly, the magnitude of the leakage flux φ from the yoke 22 is substantially uniform all over the entire length of the magnet 21 in the optical axis direction. Therefore, the magnetic attraction force of the magnet 21 acting on the magnetic member 24 is constant irrespective of where the lens holding member 26 is located in its operation range, and the biasing force for removing the play can be exerted stably on the lens holding member 26.

As per the above, a voice coil motor is used as an actuator for driving the lens holding member 26, and leakage fluxes φ from the closed magnetic circuit of the yoke 22 among the magnetic fluxes generated by the magnet 21 exert a magnetic attraction force M on the magnetic member 24. Accordingly, the lens holding member 26 on which the magnetic member 24 is provided is subjected to the magnetic attraction force M in the direction toward the magnet 21, and the magnetic attraction force M acts in a composite manner with the gravity G generated by the self weight of the lens holding member 26. The resultant force biases the lens holding member 26 toward the guide bars 27a, 27b.

In other words, the lens holding member 26 is shifted in one direction relative to the guide bars 27a, 27b, whereby the play is removed. Consequently, displacement or tilt of the lens 25 due to fitting play is prevented, and high precision in lens drive control is achieved. Thus, the optical performance of the lens is enhanced.

As per the above, by providing a magnetic member 24 on a lens holding member 26 in a lens barrel equipped with a voice coil motor, play between the lens holding member 26 and a guide member can be removed. In this structure, an increase in the cost and an enlargement of the space required to accommodate parts involved by an increase in the number of parts and/or complexity of the structure and assembly can be made small as compared to conventional structures for removing play, and improvement in the optical performance of the lens barrel can be achieved at a low cost while saving space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-339482, filed Dec. 18, 2006, which is hereby incorporated by reference herein in its entirety.

What is claimed is:

1. A lens barrel comprising:

a lens holding member that holds a lens; and a voice coil motor that drives the lens holding member along a guide member, wherein: a coil of the voice coil motor is fixedly attached on the lens holding member; a magnetic circuit element is formed by a yoke of the voice coil motor and by a board-shaped magnet attached to the yoke; and the magnetic circuit element is fixedly attached on a fixed portion that holds the lens holding member, wherein a stick of magnetic member is fixedly attached on the lens holding member, and the lens holding member is shifted in one direction relative to the guide member by means of a magnetic attraction force acting between the stick of magnetic member and the board-shaped magnet of the voice coil motor, and wherein a movable range of the stick of magnetic member in the optical axis direction is within a range of an entire length of the board-shaped magnet along the optical axis direction.

* * * * *